United States Patent [19]

Schwartz et al.

[11] Patent Number: 5,551,722
[45] Date of Patent: Sep. 3, 1996

[54] VEHICLE SUSPENSION LINK

[75] Inventors: Andrew W. Schwartz, Vernon Hills; William K. Hayes, Lake Bluff; John E. Bettini, St. Charles, all of Ill.

[73] Assignee: MacLean-Fogg Company, Mundelein, Ill.

[21] Appl. No.: 701,363

[22] Filed: May 10, 1991

Related U.S. Application Data

[63] Continuation of Ser. No. 457,912, Dec. 27, 1989, abandoned, which is a continuation-in-part of Ser. No. 262,768, Oct. 26, 1988, abandoned.

[51] Int. Cl.$^6$ .................................................. B60G 11/20
[52] U.S. Cl. ............................................ 280/689; 411/546
[58] Field of Search ...................................... 280/689, 723, 280/716; 403/377, 365, 226, 228; 411/546, 389, 368, 366; 267/148, 149, 276; 74/579 R

[56] References Cited

U.S. PATENT DOCUMENTS

| | | | |
|---|---|---|---|
| 2,027,577 | 1/1936 | Crane | 267/11 |
| 2,094,142 | 9/1937 | Brunnemer | 267/20 |
| 2,113,071 | 4/1938 | Allen | 267/15 |
| 2,555,141 | 5/1951 | Leighton | 267/11 |
| 2,660,449 | 11/1953 | MacPherson | 280/96.2 |
| 2,661,969 | 12/1953 | Thiry | 403/223 |
| 2,950,774 | 8/1960 | Eyb | 180/73 |
| 2,961,253 | 11/1960 | Allison | 280/96.2 |
| 3,181,885 | 5/1965 | Baracos et al. | 280/124 |
| 3,205,967 | 9/1965 | Stotz et al. | 180/73 |
| 3,212,387 | 10/1965 | Madansky | 411/546 |
| 3,315,952 | 4/1967 | Vittone | 267/11 |
| 3,726,542 | 4/1973 | Kolbe | 280/112 A |
| 3,733,087 | 5/1973 | Allison | 280/96.2 R |
| 4,066,278 | 1/1978 | Takagi | 280/710 |
| 4,113,278 | 9/1978 | Rissberger | 280/689 |
| 4,143,887 | 3/1979 | Williams et al. | 280/697 |
| 4,203,615 | 5/1980 | Cislo et al. | 280/689 |
| 4,369,988 | 1/1983 | Takagi | 280/689 |
| 4,621,831 | 11/1986 | Takadera et al. | 280/689 |
| 4,636,102 | 1/1987 | Waisbrod | 403/228 |
| 4,636,106 | 1/1987 | Waisbrod | 403/228 |
| 4,648,620 | 3/1987 | Nuss | 280/689 |
| 4,664,408 | 5/1987 | Saotome et al. | 280/689 |
| 4,673,240 | 6/1987 | Byfield, Jr. | 411/389 |
| 4,781,364 | 11/1988 | Finn et al. | 267/260 |
| 4,944,523 | 7/1991 | Hardy et al. | 280/689 |

FOREIGN PATENT DOCUMENTS

| | | |
|---|---|---|
| 58-209607 | 12/1983 | Japan . |
| 533159 | 8/1938 | United Kingdom . |

*Primary Examiner*—Karin L. Tyson
*Attorney, Agent, or Firm*—Brinks Hofer Gilson & Lione

[57] ABSTRACT

A vehicle suspension link or attachment includes prefabricated and assembled elements comprising a bolt or stud assembly and retainer elements on each end. The stud or bolt assembly is mounted between two suspension elements and secured by the retainer assemblies to provide a rigid, spaced, shock-absorbing connection between components of a vehicle suspension system. The invention is used in one form as a connecting link between the end of a stabilizer bar or anti-sway bar and the movable mounting arms of the vehicle's independent suspension system. The stud type suspension link includes a single spacer element or a pair of spaced-apart spacer elements which are integrally molded on the stud.

8 Claims, 3 Drawing Sheets

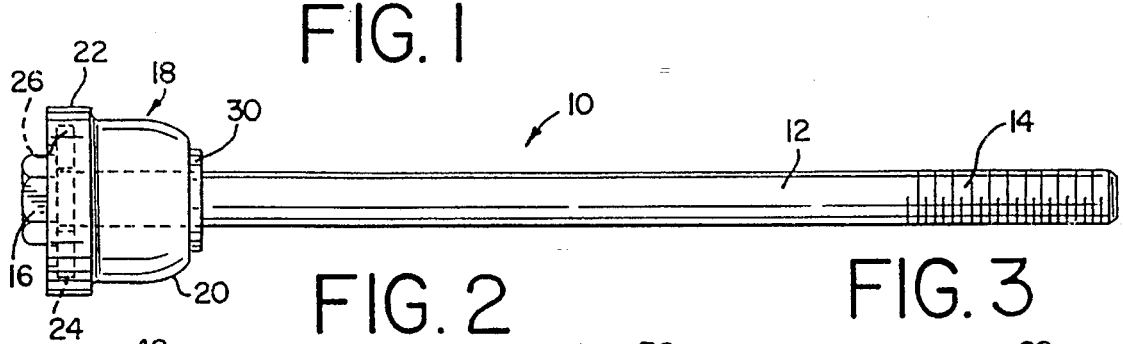
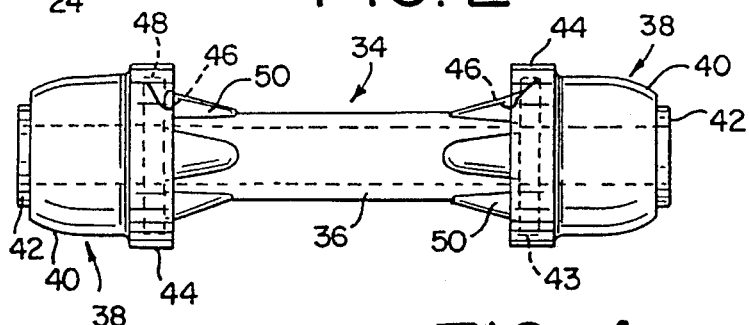
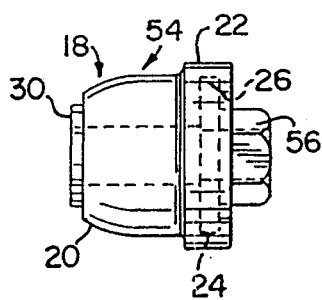
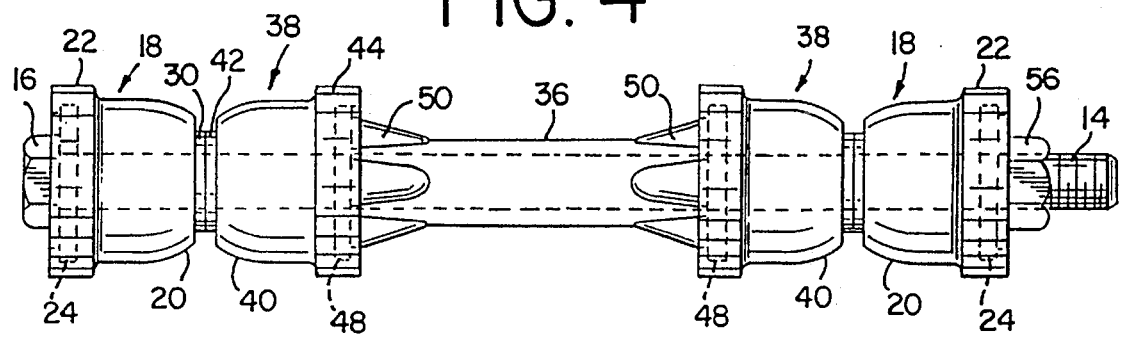
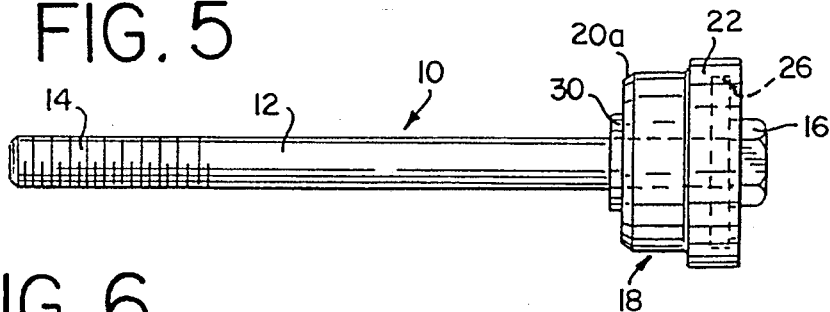
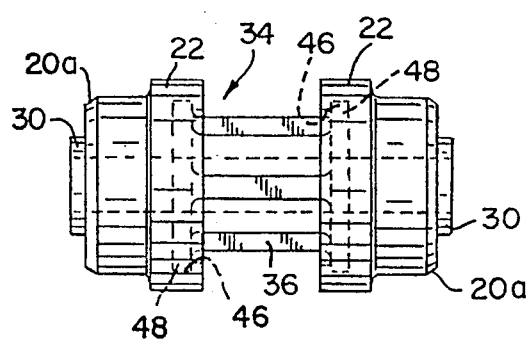
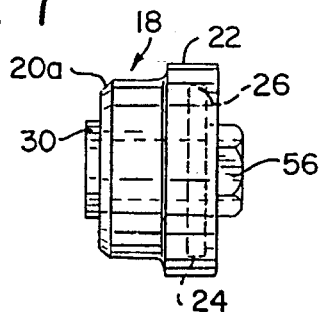

VEHICLE SUSPENSION LINK

CROSS-REFERENCE TO OTHER APPLICATIONS

This is a continuation of Ser. No. 07/457,912, filed Dec. 27, 1989, and now abandoned; which is a continuation-in-part of Ser. No. 07/262,768, filed Oct. 26, 1988, and now abandoned.

FIELD OF THE INVENTION

This invention relates to vehicle suspension systems and in particular to a stabilizer bar connector link.

BACKGROUND OF THE INVENTION

For many years, automobiles and other vehicles have been provided with independent suspension systems which absorb road shocks and other vibrations to provide a smoother, more comfortable ride for the occupants of the vehicle.

In suspensions of this type, a stabilizer is often incorporated to increase the roll rigidity and improve the steering stability of the vehicle. Typically, the stabilizer is a rod-like, elastic member having a central torsion bar portion oriented laterally of the vehicle and two integral arm portions provided at each end of the central rod portion forming substantially the shape of three sides of a polygon. The central rod portion, generally adjacent to each arm portion, is rotatably supported about a longitudinal axis from the vehicle body and each of the ends of the arms are coupled to a suspension arm by a connector link. When the vehicle is subjected to rolling, for example, by centrifugal force, the arm portions pivot relatively about the longitudinal axis of the central rod portion causing torsion forces which, through the arms, urge the suspension arms of the vehicle toward their normal position.

These types of torsional stabilizer bars as well as other suspension elements have proven useful in vehicles for many years and examples of suspension links for vehicle suspensions or stabilizer bars of various configurations are shown in British Patent 533,159 and U.S. Pat. Nos. 2,027,577, 2,094,142, 2,555,141, 2,660,449, 2,661,969, 2,950,774, 2,961,253, 3,181,885, 3,205,967, 3,212,387, 3,726,542, 3,733,087, 4,066,278, 4,143,887, 4,203,615, 4,621,831, 4,664,408, and 4,781,364. Stabilizers act in a manner that when a pair of left and right wheels differ in level from each other due to a cornering maneuver, the vehicle body will be prevented from excessive rolling or leaning to either side by torsional or other resistance produced in the stabilizer bar.

In response to the driving public demands, more "sporty" cornering capability, automotive designers have increased the diameters of conventional stabilizer bars. Although this modification beneficially increases roll stiffness, it also degrades the ride quality in many cases. While designers have thought to enhance the function of stabilizer bars in a variety of ways, such as the adjustable suspension stabilizer bar shown in U.S. Pat. No. 4,648,620, very little attention has been paid to other elements of the suspension system. For example, many improvements have been made in shock absorbers and tire constructions as well as various independent suspension arms and new designs. For the past twenty years there has been substantially no improvement or change in the attachment links or connectors for the various elements of the suspension system.

Vehicle supension system connectors such as the stabilizer bar attachment have essentially remained unchanged for many years. These attachments as well as many other suspension system attachments experience a variety of environments which result in corrosion and failure during the useful life of the vehicle. The lifetime of such an attachment will depend upon its components ability to maintain their original dimensions and material characteristics. Because these vehicle components are primarily utilized on the under carriage of a vehicle, they are subjected to the harsh effects of rain, salt and sleet.

Typically, these attachments are assemblies of many different components which must be manually assembled during the production of a vehicle. A stabilizer link bar attachment generally falls into one of two broad categories, a bolt-type construction or a stud-type construction. In the bolt-type construction, a suitably dimensioned bolt is used to connect the stabilizer bar to the vehicle suspension arm. The presently used bolt-type construction includes seven steel parts which are subject to the corrosive effects of the environment, primarily road salts and moisture. The attachment includes several rubber bushing or grommet portions which, are to a lesser degree, affected by the same environmental hazards. When assembled, the bolt-type link has its head and retaining nut in engagement with a pair of outer washers which are cushioned by pliable bushings or grommets engaging the exterior surfaces of the stabilizer bar arms and the vehicle suspension arms. A pair of similarly shaped grommets engage the interior surfaces of the respective vehicle elements and are in engagement with a pair of inner washers which are maintained at a predetermined spaced distance by a cylindrical sleeve mounted on the shaft of the bolt. Therefore, typically, this type of construction includes eleven elements, seven of which are made of steel. Typically the steel is treated with a conventional plating to assist in the prevention of corrosion. However, all of the abutment points, primarily between the bolt head or retainer nut and the respective adjacent washer and between the ends of the spacer sleeve and adjacent interior pair of washers. Spaces between these elements permit the introduction of road salts and moisture which lead to corrosion and degradation of the part. A high incidence of severely rusted bolt components has been found in vehicles during the course of their use. Depending upon the particular climate in the area in which the vehicle is used, more or less corrosion in the metal components have been noted.

While corrosion has often caused premature failure of the attachment assembly during normal use, it is often necessary to change the rubber bushings or grommets which become incapable of performing their intended function due to the environmental degradation. In this situation, the attachment must be disassembled to replace the worn bushing elements and quite often during this operation the bolt portion is broken due to the torsional forces during the attempt at disassembly or must be cut apart to make the disassembly possible.

The stud-type attachment construction is essentially the same as the bolt-type construction but includes two threaded ends requiring the use of an additional retainer nut on the "top end" of the stud. In this stud-type construction, it is necessary to permit means to restrain the stud from rotating during tightening of the nut. Therefore, in this type of construction, a spacer sleeve generally cannot be used since the central portion of the stud must be grasped to prevent its rotation. Therefore, much more expensive "spacing means" must be provided. One form of a spacing mechanism is to create flanges at predetermined points along the shaft of the stud which maintain a predetermined dimension between the interior pair of washers.

SUMMARY OF THE INVENTION

According to the present invention, a bolt-type stabilizer link bar includes a bolt component and only two other components which dramatically reduce the number of pieces to be assembled during production. The design includes a central, flanged plastic spacer which eliminates two steel washer and one steel tubular spacer by components that are much more resistant to corrosion and at the same time provide a better seal to prevent moisture from attacking the bolt.

In the stud-type version of the link attachment, the present invention includes a stud having a unitarily molded central, flanged plastic portion which both performs the spacing function as desired while eliminating expensive manufacturing operations required for standard stud-type spacing.

An object of the present invention is to provide a simplified vehicle suspension link attachment.

Another object of the invention is to provide a link attachment having fewer components required for assembly.

Another object of the present invention is to utilize non-corrosive thermoplastic components to replace traditional steel components.

Another object of the present invention is to provide a more effective seal between the attachment components to reduce attachment corrosion and therefore extend the life of the components.

Other objects and advantages of the present invention will be apparent upon reference to the accompanying description when taken in conjunction with the following drawings.

BRIEF DESCRIPTION OF THE DRAWINGS

FIG. 1 is a side elevation view of the bolt component of a bolt-type attachment made in accordance with the present invention;

FIG. 2 is a side elevation view of the spacer component of a bolt-type attachment made in accordance with the present invention;

FIG. 3 a side elevation view of the retainer component of a bolt-type stabilizer made in accordance with the present invention;

FIG. 4 is a side elevation view of an assembled bolt-type attachment made in accordance with the present invention;

FIG. 5 is a side elevation view of another embodiment of the bolt component of the attachment of the present invention;

FIG. 6 is a side elevation view of another embodiment of the spacer component of the attachment of the present invention;

FIG. 7 is a side elevation view of another embodiment of the nut component of the present invention;

DETAILED DESCRIPTION OF THE PREFERRED EMBODIMENT

Figure 8:
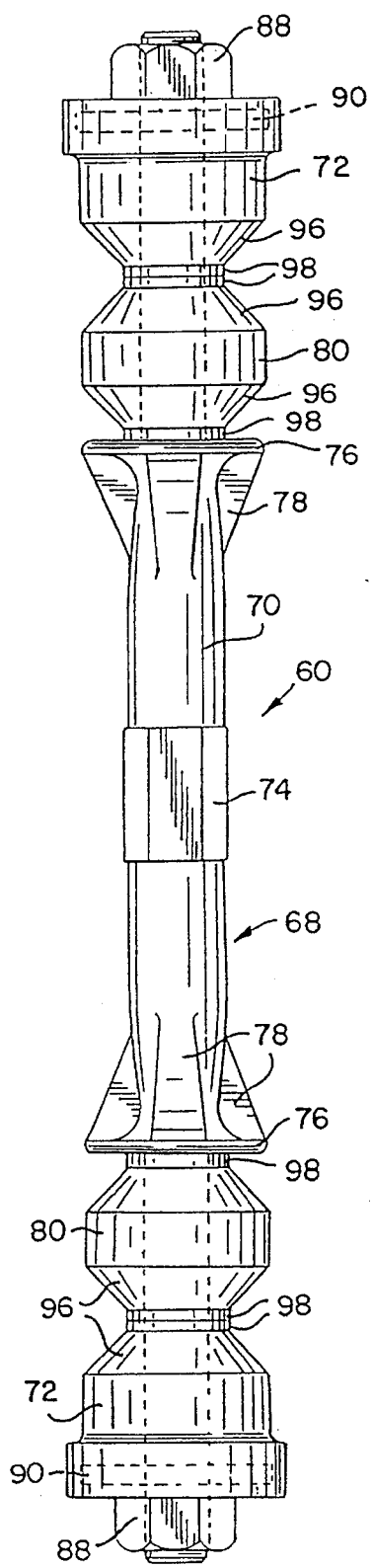
FIG. 8 is a side elevation view of an assembled stud-type attachment made in accordance with the present invention.

FIG. 1 shows the bolt component, generally designated 10, of a bolt-type attachment made in accordance with the present invention. The bolt component includes a bolt 12 of predetermined length which includes a threaded end 14 and a hex-shaped head portion 16. The bolt 12, including the threads 14 and head 16, as well as the other metal components of the present invention are generally made of steel and coated with a corrosive resistant plating. These corrosive-resistant platings are generally of any standard type, such as zinc, organic or phosphate and oil. The bolt component includes a pliable bushing or grommet 18 for assembly adjacent the head 16 of the bolt. The bushing 18 is shaped to engage an aperture in the arm of the stabilizer bar and may include a radius or tapered interior end 20. The exterior side of the bushing 18 includes an enlarged diameter portion 22 which encapsulates a steel or non-corrosive plastic washer 24. The bushing 18 is generally molded by conventional molding techniques or injection molding techniques and preferably includes a groove 26 formed in the enlarged end portion 22 which facilitates removal of the captured washer 24. However, it is not necessary that the washer 24 be removable but only that sufficient clearance be provided during the molding operation so that the abutment surface of the head 16 contacts the washer 24 without interference. In the embodiment shown in FIG. 1, the bushing 18 includes an optional, cylindrical centering protrusion 30 which fits within the aperture in the stabilizer link arm.

A spacer component 34 is shown generally in FIG. 2 to include a center cylindrical portion 36. The interior bushings 38 in this embodiment are substantially identical to the bushing 18 including tapered end portions 40 and centering protrusions 42. The enlarged, opposite end 44 of each bushing 38 similarly includes a groove 46 which is integrally molded or formed during the injection molding.

Previously, in suspension links of this type, the bushings or grommets were made of conventional molded rubber. In accordance with the present invention, and to facilitate component preassembly and to improve the useful life of the attachment, the bushings 18 and 38 are made of urethane or thermoplastic rubber which are injection molded so as to include the retaining grooves 26 and 46 as well as any other features such as the pilot projection 30 and 42. The spacer component 34 includes a special designed spacer element 36. The spacer element 36 includes a pair of flanged ends 48 which are integrally molded with the spacer 36 for capturing by the groove 46, the bushings 38. A plurality of generally triangular shaped webs 50 are also integrally molded with the spacer body 36. The entire spacer 36 is made of a suitable injection moldable plastic such as fiberglass filled nylon or polyester. The groove within the bushings 38 which trap the flanged end 48 of the spacer 36 substantially prevent the introduction of any moisture to the bolt unlike prior art metal sleeve and washer contact.

FIG. 3 shows a retainer assembly, generally designated 54, which includes a bushing 18 having a tapered engagement surface 20 and an enlarged cylindrical end portion 22. The enlarged end portion 22 similarly includes a molded groove 26 for engaging and capturing a washer 24 in the manner as previously discussed. In the retainer assembly, however, the washer 24 includes a rotatably captured nut 56 which engages the threads 14 on the end of the bolt during assembly.

The nut 56 is tightened until it engages the unthreaded portion of the bolt 12 and a predetermined amount of torque is applied. Other lock nut features could be utilized to improve this feature of the invention. Therefore, the retainer component 54 includes in a preassembled form the nut, washer and bushing all of which are separate elements in many existing constructions. The spacer component 34 replaces two bushings, two washers and a metal tubular spacer, i.e., five separate pieces, in one component for assembly into the final attachment. The bolt component 10 includes as one preassembled element the bolt end washer and head end bushing as one preassembled component so that during assembly many fewer components, i.e., three, instead of eleven, are handled during production for final assembly. In one typical use, the bolt component 10 is mounted on the stabilizer arm through its aperture, the spacer component 34 is slipped on the shaft of the bolt which extends through the aperture in the suspension arm and the retainer component 54 is threaded on the thread 14 on the end of the bolt 12 and tightened with suitable automated equipment.

Therefore the reduction in the number of parts greatly simplifies the assembly and use of the attachment in production as well as providing substantial greater corrosion resistant junctions at the head and nut ends of the bolt and at the junctions between the spacer element 36 and the interior bushings 38.

FIG. 4 shows the attachment in the assembled configuration prior to mounting to the suspension system of a vehicle. The attachments of the present invention can be assembled to the stage as shown in FIG. 4 by the attachment manufactured prior to shipment or may be manufactured to the stages as shown in FIGS. 1, 2 and 3 for shipment to the vehicle productin facility for subsequent assembly during production.

FIGS. 5 and 6 show another embodiment of the bolt-type attachment of the present invention where similar numerals are used to indicate similar components. In this embodiment, the shape of the bushing has been modified for a particular application. The ends of each bushing include a pilot or centering protrusion 30 and a chamfered end portion 20a of the bushing. However, each bushing includes the appropriate washer or flange capturing groove 26 or 46 and the retainer component as shown in FIG. 7 includes a rotatably captured nut 56 on the washer 24. Preferably, as shown in the embodiment of FIGS. 5, 6 and 7, the grooves 26 and 46 are identical in diameter and depth so that all of the bushings are interchangeable and only one mold is required for manufacturing all of the bushings. Again, the final assembly is accomplished utilizing three components instead of the normal eleven components used in the prior art. In addition, the reduction in the number of metal components as well as the increased moisture barriers created at many contact points substantially reduces potential corrosion of the attachment.

FIGS. 8–11 show two embodiments of a stud-type attachment made in accordance with the present invention. The assembled stud-type attachment, generally designated 60, is shown in one form in the assembled state in FIG. 8. For ease in understanding, the following description of the components will be made with reference to FIGS. 9–11. The stud-type attachment 60 includes a central shaft or stud 64 which includes threads 66 at opposite ends thereof. A central spacer component, generally designated 68, performs the function of the spacer component 36 of the bolt-type attachment construction. However, in this embodiment, the spacer 70 is molded, again of suitable fiberglass reinforced nylon or polyester, onto the center portion of the stud 64 so as to be integral therewith. During assembly, the integral forming of the spacer 70 and the stud 64 permits tightening of the retainer components or bushings generally designated 72, shown in FIG. 10, by use of a hex-shaped, enlarged, central portion 74 molded integrally on the spacer member 70. In this embodiment the spacer member 70 again includes a pair of integrally molded flanges 76 at opposite ends thereof which are further strengthened by a plurality of webs or flanges 78 between the body portion 70 and the respective flanges 76. In this embodiment, the interior bushings 80 abut the flanges 76 that include more or less rounded or spherical contact surfaces 82 for abutment against the respective flanges 76 of the spacer component 68. Alternatively, the bushings 80 could be designed with flange encapsulating grooves as described previously with respect to the bolt-type spacer component 34. However, the integral forming of the stud and spacer body 70 permits the bushings 80 to be retained on the shaft portion of the stud 64 adjacent the flanges 76.

The bushings 80 are preferably retained on the shaft 64 by a plurality of inwardly, radially directed protrusions. However, the bushings 80 could be secured by other means such as a small diameter outwardly extending protrusion from the respective flange 76 on either side of the spacer body 70. Likewise, the diameter of the aperture in the bushing 80 can be designed to similarly generate the necessary friction.

Figure 9:
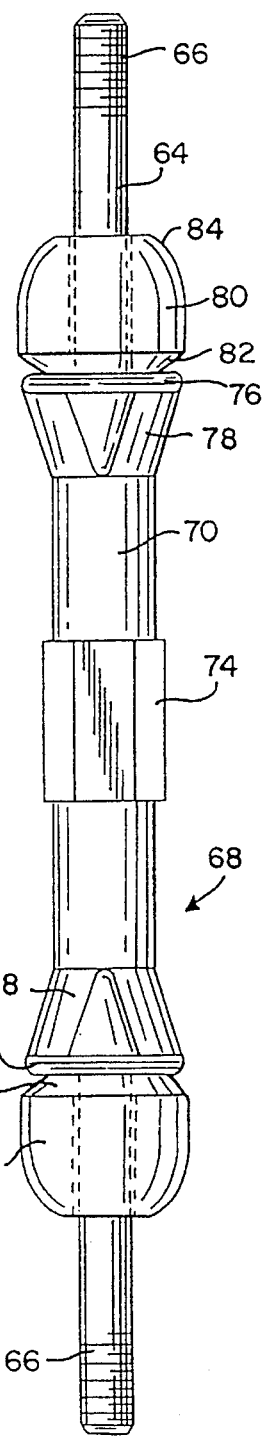
FIG. 9 is a side elevation view of a stud-type attachment of the present invention.
Figure 10:
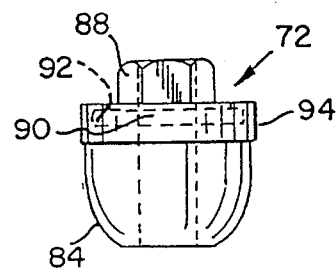
FIG. 10 is a side elevation view of the retainer component for the stud-type attachment of the present invention.
Figure 11:
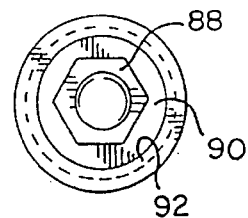
FIG. 11 is an end view of the retainer component of the attachment of FIG. 9.

Again, the bushings 80 as shown in FIG. 9, are designed with a rounded or tapered end portion 84 which may, if desired, enter the aperture in the adjacent suspension system component. In the stud-type configuration, a pair of retainer components or bushings 72 are provided to be threaded onto either end of the stud threads 66. As before, the retainer component or bushing 72 includes a threaded nut portion 88 which is rotatably connected to a washer 90 captured within a groove 92 formed in the enlarged end portion 94. The retainer component or bushing 72 has a similarly shaped radius 84 for centering on the aperture of the adjacent suspension component to facilitate alignment during tightening of the nuts 88 by typical automatic tools. In this design, a wrench may be used to engage the flats of the molded hex portion 74 to permit independent tightening or subsequent disassembly by removal of one or both of the retainer components. The present invention provides a stud-type link where only three components provide fast assembly in production. Again, the parts can be shipped separately or in the assembled fashion as shown in FIG. 8. In the stud-type attachment of the present invention, while there are three components utilized for a final product, as with the bolt-type construction, it is only necessary to manufacture or purchase two different types of components since all of the retainer components 72 of the stud-type construction are identical.

The assembled stud-type attachment shown in FIG. 8 includes modified flanges 76 on the spacer component 70 and differently shaped bushings 72 and 80. Again the bushings 72 include a groove encapsulated washer 90 rotatably connected to a tightening nut 88. The bushings each include a 45° chamfer 96 and a pilot or centering cylindrical protrusion 98. The interior bushings 80 are symmetrical about a midline for convenience in a particular adaptation.

Figure 12:
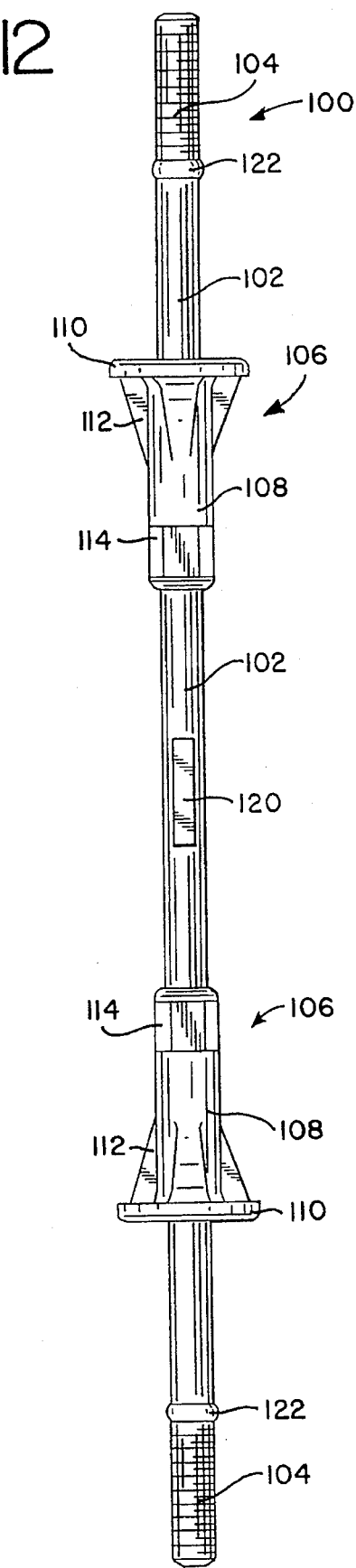
FIG. 12 is an alternate embodiment of the stud type attachment made in accordance with the present invention.

An alternate embodiment of the stud-type suspension link, generally designated 100, is illustrated in FIG. 12.

Again, this attachment includes a central stud 102 having a pair of threaded ends 104 and a pair of spaced apart, spacer elements, generally designated 106. The spacer elements 106 are integrally molded to the stud 102 in a spaced apart relationship as depicted in FIG. 12. Each spacer element includes a cylindrical body portion 108 and an enlarged flange at 110 for engagement with suitable bushing such as the element 80 in FIG. 9. Each flange 110 includes a plurality of webs or flanges 112 to strengthen the periphery of the circular flange 110. The interior end of each spacer 106 may include a portion having flats 114, or may be circular as the body portion 108. The central portion of the stud 102, between the spacer elements 106, in this embodiment, is exposed and includes a pair of flats 120 for engagement with a tool to prevent rotation of the stud while retainer components such as 72 are mounted on the threaded portions 104 to encapsulate a pair of suspension elements as previously described. In this embodiment, an enlarged ridge 122, is shown formed adjacent each threaded end section to facilitate retention of the bushing members. As with the embodiments of FIGS. 8 and 9, two identical retainer components 72 are used with each central stud component 100 and therefore only three parts need be assembled for connecting the vehicle suspension components. With this alternate embodiment, however, the amount of plastic material required to form the spacer elements 106 is susbstantially less than that required for the single, central spacer component 68 of the embodiments shown in FIGS. 8 and 9. Therefore, a substantial savings in the cost of material can be achieved while retaining the same advantages heretofore described.

The foregoing detailed description has been given for clearness of understanding only and no unnecessary limitations should be understood therefrom since many modifications and changes in design can be made without deviating from the present invention.

We claim:

1. An attachment link for connecting a stabilizer arm to a suspension arm of a vehicle, comprising:
   (a) a shaft, threaded on each end, having a centrally located, integrally molded corrosion-resistant spacer with an enlarged flange at each end thereof;
   (b) a pair of interior bushings mounted on the shaft adjacent the flanges; and
   (c) a pair of retainer components for capturing the stabilizer arm and the suspension arm on opposite ends of the spacer, said retainer components including generally similarly shaped urethane retainer bushings each including an outwardly directed integrally molded groove for capturing and retaining a washer, the washer itself retaining a threaded nut thereon for engagement with the threaded ends of the shaft;
   (d) wherein the interior bushings include inwardly, radially directed protrusions for frictionally retaining the interior bushings on the shaft.

2. A vehicle suspension attachment providing rigid, spaced, shock absorbing connections to elements of a vehicle suspension including;
   (a) a connector shaft;
   (b) retaining means for opposite ends of the shaft;
   (c) integral spacer means of non-corrosive plastic molded on the shaft and including a central, hex-shaped portion integrally molded therewith; and
   (d) a plurality of pliant engagement means for mounting on the shaft in engagement with at least two vehicle suspension elements for maintaining a constant spaced connection therebetween.

3. A vehicle suspension attachment providing rigid, spaced, shock absorbing connections to elements of a vehicle suspension including:
   (a) a connector shaft;
   (b) retaining means for opposite ends of the shaft;
   (c) integral spacer means molded of non-corrosive plastic and mounted on the shaft and including a central, hex-shaped portion integrally molded therewith; and
   (d) a plurality of pliant engagement means for mounting on the shaft in engagement with at least two vehicle suspension elements for maintaining a constant spaced connection therebetween.

4. An attachment link for connecting vehicle suspension elements comprising:
   (a) a threaded shaft having a centrally located, integrally molded corrosion-resistant spacer, an enlarged flange at each end of the spacer, and socket means on the spacer for receiving means to prevent the shaft from rotating;
   (b) a pair of pliant interior bushings mounted on the shaft adjacent the flanges;
   (c) a pair of pliant retainer bushings; and
   (d) a pair of retainer components for capturing the suspension elements on opposite ends of the shaft.

5. The attachment of claim 1, including socket means on said spacer for receiving means to prevent the shaft from rotating.

6. The attachment of claim 1, wherein the interior bushings and retainer bushings are injection molded urethane.

7. The attachment of claim 1, wherein the interior bushings and retainer bushings are made from injection molded thermoplastic rubber.

8. The vehicle suspension attachment of claim 3, further characterized in that:
   (a) said integral spacer means has an enlarged flange at each end;
   (b) said plurality of pliant engagement means comprise a pliant interior bushing mounted on the shaft adjacent each of said flanges;
   (c) a protrusion, having a small diameter, extends outwardly from each of said flanges along said shaft; and
   (d) each of said pliant interior bushings is secured on the shaft during assembly by a corresponding protrusion.

* * * * *